US008483907B2

(12) United States Patent
Tarte (10) Patent No.: US 8,483,907 B2
(45) Date of Patent: Jul. 9, 2013

(54) CUSTOMIZABLE GRAPHICAL DISPLAY (75) Inventor: Christopher Tarte, Roanoke, TX (US)

(73) Assignee: PACCAR Inc, Bellevue, WA (US)

( * ) Notice: Subject to any disclaimer, the term of this patent is extended or adjusted under 35 U.S.C. 154(b) by 473 days.

(21) Appl. No.: 12/711,090

(22) Filed: Feb. 23, 2010

(65) Prior Publication Data
US 2011/0208389 A1 Aug. 25, 2011

(51) Int. Cl.
G06F 19/00 (2011.01)
G06F 3/048 (2006.01)
G09G 5/02 (2006.01)

(52) U.S. Cl.
USPC ............................ 701/36; 345/77; 715/764

(58) Field of Classification Search
USPC ............ 701/1, 36, 49; 715/764, 765; 345/10, 345/12, 20, 77, 83, 690
See application file for complete search history.

(56) References Cited

U.S. PATENT DOCUMENTS

| | | | |
|---|---|---|---|
| 4,072,924 A | 2/1978 | Pomerantz | |
| 4,287,503 A | 9/1981 | Sumida | |
| 4,621,306 A * | 11/1986 | Sell | 362/29 |
| 4,787,039 A | 11/1988 | Murata | |
| 4,787,040 A | 11/1988 | Ames | |
| 4,809,177 A | 2/1989 | Windle | |
| 5,241,295 A | 8/1993 | Madau | |
| 5,347,260 A | 9/1994 | Ginzel | |
| 5,371,487 A | 12/1994 | Hoffman | |
| 5,453,939 A | 9/1995 | Hoffman | |
| 5,555,502 A | 9/1996 | Opel | |
| 5,757,268 A | 5/1998 | Toffolo | |
| 5,764,139 A | 6/1998 | Nojima | |
| 5,949,346 A * | 9/1999 | Suzuki et al. | 340/815.45 |
| 5,982,352 A | 11/1999 | Pryor | |
| 6,008,800 A | 12/1999 | Pryor | |
| 6,009,355 A | 12/1999 | Obradovich | |
| 6,119,060 A * | 9/2000 | Takayama et al. | 701/36 |
| 6,289,332 B2 | 9/2001 | Menig | |
| 6,429,845 B1 | 8/2002 | Unseld | |
| 6,434,450 B1 | 8/2002 | Griffin, Jr. | |

(Continued)

FOREIGN PATENT DOCUMENTS
JP 2005-067406 A 3/2005

OTHER PUBLICATIONS

Office Action mailed Dec. 8, 2011, in U.S. Appl. No. 12/711,016, filed Feb. 23, 2010, 31 pages.

(Continued)

Primary Examiner — Khoi Tran
Assistant Examiner — Jason Holloway
(74) Attorney, Agent, or Firm — Christensen O'Connor Johnson Kindness PLLC (57) ABSTRACT Aspects of the disclosed subject matter are directed to customizing the colors of instruments that are used to convey vehicle readings. In accordance with one embodiment, a method is provided that obtains input to perform a color change to one or more instruments presented on a graphical display. For each instrument affected by the color change, a determination is made regarding whether a threshold level of contrast exists between a symbol graphic of the instrument and one or more background colors. If a threshold level of contrast does not exist, the contrast ratio between the symbol graphic and one or more background colors is adjusted to at least the threshold level. Then the method causes the graphical display to render the one or more instruments in accordance with the received color selections.

20 Claims, 6 Drawing Sheets

U.S. PATENT DOCUMENTS

| | | |
|---|---|---|
| 6,564,112 B1 | 5/2003 | Factor |
| 6,667,726 B1 * | 12/2003 | Damiani et al. ............... 345/1.1 |
| 6,693,523 B1 | 2/2004 | Abel |
| 6,788,196 B2 | 9/2004 | Ueda |
| 6,819,056 B2 | 11/2004 | Lin |
| 6,870,469 B2 | 3/2005 | Ueda |
| 6,874,012 B1 | 3/2005 | St. Pierre |
| 6,959,223 B2 | 10/2005 | Ogasawara |
| 6,972,665 B2 | 12/2005 | Wang |
| 6,990,922 B2 | 1/2006 | Ichikawa |
| 7,009,504 B1 | 3/2006 | Banter |
| 7,015,891 B2 | 3/2006 | Lo |
| 7,084,859 B1 | 8/2006 | Pryor |
| 7,310,071 B2 | 12/2007 | Cuprys |
| 7,499,778 B2 | 3/2009 | Obradovich |
| 7,609,152 B2 | 10/2009 | Crowe |
| 7,642,901 B2 | 1/2010 | Kato |
| 7,683,771 B1 * | 3/2010 | Loeb ............................. 340/461 |
| 8,125,346 B2 * | 2/2012 | Ballard et al. ................ 340/688 |
| 2001/0012976 A1 | 8/2001 | Menig |
| 2004/0140948 A1 | 7/2004 | Cuprys |
| 2004/0200923 A1 | 10/2004 | Lee |
| 2004/0207334 A1 | 10/2004 | Lin |
| 2004/0212579 A1 | 10/2004 | Lo |
| 2005/0177287 A1 | 8/2005 | Wang |
| 2006/0036335 A1 | 2/2006 | Banter |
| 2006/0218051 A1 | 9/2006 | Westberg |
| 2006/0274213 A1 | 12/2006 | Saier |
| 2007/0063980 A1 | 3/2007 | Eich |
| 2007/0069880 A1 * | 3/2007 | Best et al. ..................... 340/461 |
| 2007/0101290 A1 | 5/2007 | Nakashima |
| 2007/0132572 A1 | 6/2007 | Itoh |
| 2008/0122799 A1 | 5/2008 | Pryor |
| 2008/0129684 A1 | 6/2008 | Adams |
| 2008/0129707 A1 | 6/2008 | Pryor |
| 2008/0133133 A1 | 6/2008 | Abels |
| 2008/0192024 A1 | 8/2008 | Mita |
| 2008/0211652 A1 * | 9/2008 | Cope et al. .................... 340/461 |
| 2008/0238838 A1 | 10/2008 | Cunningham |
| 2008/0244460 A1 | 10/2008 | Louch |
| 2009/0112389 A1 | 4/2009 | Yamamoto |
| 2009/0174533 A1 | 7/2009 | Bowden |
| 2009/0174682 A1 | 7/2009 | Bowden |
| 2009/0300548 A1 | 12/2009 | Sullivan |
| 2011/0175754 A1 | 7/2011 | Karpinsky |
| 2011/0181786 A1 * | 7/2011 | Yamazaki et al. ............ 348/671 |

OTHER PUBLICATIONS

Final Office Action mailed May 11, 2012, in U.S. Appl. No. 12/711,016, filed Feb. 23, 2010, 27 pages.

Office Action mailed Dec. 9, 2011, in U.S. Appl. No. 12/711,076, filed Feb. 23, 2010, 27 pages.

Final Office Action mailed Sep. 12, 2012, in U.S. Appl. No. 12/711,076, filed Feb. 23, 2010, 30 pages.

Restriction Requirement mailed Mar. 23, 2012, in U.S. Appl. No. 12/711,054, filed Feb. 23, 2010, 8 pages.

Office Action mailed Apr. 26, 2012, in U.S. Appl. No. 12/711,054, filed Feb. 23, 2010, 17 pages.

Final Office Action mailed Sep. 26, 2012, in U.S. Appl. No. 12/711,054, filed Feb. 23, 2010, 15 pages.

Office Action mailed Oct. 16, 2012, in U.S. Appl. No. 12/711,013, filed Feb. 23, 2010, 15 pages.

* cited by examiner

CUSTOMIZABLE GRAPHICAL DISPLAY

BACKGROUND

Interest in providing rich user experiences in operating a vehicle has grown in parallel with the proliferation and advancement in graphical displays. In this regard, in-vehicle graphical displays installed in interior surfaces of a vehicle convey information to an operator. To improve the user experience, in-vehicle displays are becoming increasingly similar and have capabilities that parallel displays used in computing systems. As such, an in-vehicle graphical displays may include one or more LCD and/or LPD screens that have capabilities for rendering graphics, receiving touch input, and the like.

A substantial factor in determining the productivity and utility that a vehicle operator derives from a graphical display is the user-friendliness and convenience of the user experience. Even a small difference in ease of use and convenience can make a significant difference in productivity. The adoption of graphical displays presents a substantial opportunity to improve the ease of use in operating a vehicle. In addition, opportunities exist for customizing a vehicle to the tastes and needs of a particular vehicle operator.

SUMMARY

This summary is provided to introduce a selection of concepts in a simplified form that are further described below in the Detailed Description. This summary is not intended to identify key features of the claimed subject matter nor is it intended to be used as an aid in determining the scope of the claimed subject matter.

Aspects of the disclosed subject matter are directed to customizing the colors of instruments that are used to convey vehicle readings. In accordance with one embodiment, a method is provided that obtains input to perform a color change to one or more instruments presented on a graphical display. For each instrument affected by the color change, a determination is made regarding whether a threshold level of contrast exists between a symbol graphic of the instrument and one or more background colors. If a threshold level of contrast does not exist, the contrast ratio between the symbol graphic and one or more background colors is adjusted to at least the threshold level. Then the method causes the graphical display to render the one or more instruments in accordance with the received color selections.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

Prior to discussing the details of the present disclosure, it should be understood that several sections of the following description are presented largely in terms of logic and operations that may be performed by conventional components. These components, which may be grouped in a single location or distributed over a wide area, generally include processors, memory, storage devices, graphical displays, input devices, etc. In circumstances where the components are distributed, the components are accessible to each other via communication links. In the following description, numerous specific details are set forth in order to provide a description of the present disclosure. It will be apparent to one skilled in the art, however, that the disclosed subject matter may be practiced without some or all of the specific details.

Figure 1:
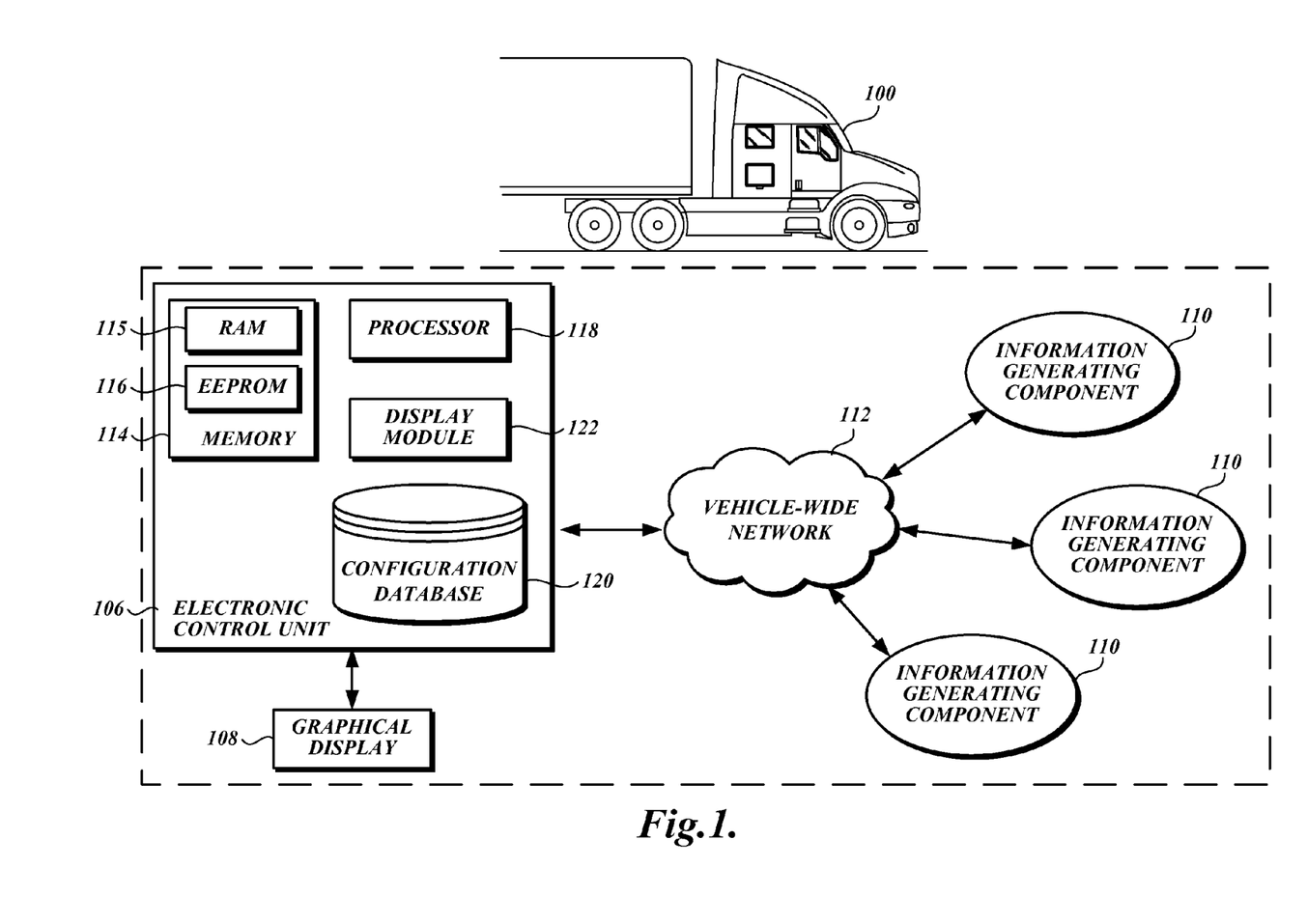
FIG. 1 is a pictorial depiction of an exemplary system architecture that illustrates components suitable for implementing aspects of the disclosed subject matter.

FIG. 1 and the following discussion are intended to provide a brief, general description of a system architecture in a truck 100 for implementing aspects of the present disclosure. In the example depicted in FIG. 1, the truck 100 includes an electronic control unit 106 that is associated with a graphical display 108. As described in further detail below, the graphical display 108 is used to present information to a vehicle operator. In addition, the electronic control unit 106 is communicatively connected to a set of information generating components 110 via a vehicle-wide network 112. One of ordinary skill in the art will appreciate that the system architecture of the truck 100 will include many more components than those depicted in FIG. 1. However, it is not necessary that all of these generally conventional components be shown or described. Moreover, while FIG. 1 depicts a truck 100, another type of "vehicle" such as a car, boat, recreational vehicle ("RV"), vessel, etc., may be used to implement aspects of the present disclosure.

As further illustrated in FIG. 1, the electronic control unit 106 may communicate with the information generating components 110 over the vehicle-wide network 112. Those skilled in the art and others will recognize that the vehicle-wide communication network 112 may be implemented using any number of different communication protocols such as, but not limited to, Society of Automotive Engineers' ("SAE") J1587, SAE J1922, SAE J1939, SAE J1708, and combinations thereof. It will be appreciated, however, that the disclosed subject matter is not limited to any particular type or configuration of control unit, or to any specific control logic for governing operation of the vehicle.

In the illustrative embodiment depicted in FIG. 1, the truck 100 includes an electronic control unit 106. Generally described, the electronic control unit 106 serves as an in-vehicle computing device for managing the collection and dissemination of information. The electronic control unit 106 may collect information over the vehicle-wide network 112 from the information generating components 110. The collected information may be processed so that the appropriate readings may be presented on the graphical display 108. In this regard and by way of example only, the information generating components 110 may report information about a number of vehicle systems, including but not limited to vehicle and engine speed, fluid levels, tire pressure monitoring, battery level, fluid level systems, transmission and engine temperatures, collision detection systems, hybrid drives, heating/cooling systems, among others. The graphical display 108 may be a liquid crystal display (LCD) or a light emitting polymer display (LPD) that may include a sensitive layer configured to recognize direct input applied to the surface of the graphical display 108. For example, the position of the direct input, the pressure of the direct input, or general direction of the direct input may be recognized in order to obtain input from a vehicle operator. In other embodiments, the truck 100 includes conventional operator control inputs (not illustrated), for obtaining input from a vehicle operation that may include, but are not limited to, buttons, switches, knobs, etc.

In the illustrative embodiment depicted in FIG. 1, the electronic control unit 106 includes a memory 114 with a random access memory ("RAM") 115 and an electronically erasable, programmable, read-only memory ("EEPROM") 116, a processor 118, a configuration database 120, and a display module 122. Those skilled in the art and others will recognize that the EEPROM 116 may be a nonvolatile memory capable of storing data even through interruptions in the availability of power. Conversely, the RAM 115 may be a volatile form of memory that stores program instructions for direct access by the processor 118. Typically, a fetch-and-execute cycle in which instructions are sequentially "fetched" from the RAM 115 and executed by the processor 118 is performed. In this regard, the processor 118 is configured to operate in accordance with executable instructions that are available from the RAM 115.

As used herein, control units, control modules, program modules, etc., can contain logic for carrying out general or specific operational features. This logic can be implemented in hardware components, such as analog circuitry, digital circuitry, processing units, or combinations thereof, or software components having instructions which can be processed by the processing units, etc. Therefore, as used herein, the term "control unit" can be used to generally describe these aforementioned components, and can be either hardware or software, or combinations thereof, that implement logic for carrying out various aspects of the present disclosure.

As further illustrated in FIG. 1, the electronic control unit 106 includes a display module 122 that provides logic for setting and/or modifying the colors in which instruments are displayed on the graphical display 108. In this regard, the term "instrument" may include gauges, indicators, or any other visual representation capable of conveying a reading to a vehicle operator. In this regard, an instrument may be comprised of various "symbol graphics" used to convey specific information including, but not limited to, text, icons, images, and combinations thereof. In one aspect, the display module 122 implements logic that allows a user to select between a palette of color choices for the purpose of customizing the colors of an instrument cluster. In particular, a user may select a template that applies a color theme to each of the instruments rendered on the graphical display 108. In addition or alternatively, a user may assign colors for the symbol graphics and/or background of individual instruments. When a color associated with an instrument is changed, the display module 122 implements logic to ensure that the instruments' symbol graphics will be readable. In particular, an automatic contrast feature is provided that compares the colors of an instrument's symbol graphics and corresponding background. By performing this comparison, a determination may be made regarding whether the contrast in an instrument's colors are sufficient to allow a reading to be easily viewed. In instances where a color change will not result in sufficient contrast, the display module 122 implements changes to effectuate a higher contrast ratio. Additional aspects of the display module 122 are described in further detail below.

As will be appreciated by those skilled in the art and others, FIG. 1 provides an example of one system architecture for implementing aspects of the present disclosure. In other embodiments, the functions and features of the truck 100 may be implemented using other components. For example, while FIG. 1 depicts an electronic control unit 106 that uses an EEPROM 116 for nonvolatile memory storage, those skilled in the art and others will recognize that other types of memory may be used. Thus, FIG. 1 depicts one component architecture for practicing the present disclosure, but other component architectures may be used without departing from the scope of the claimed subject matter.

Figure 2:
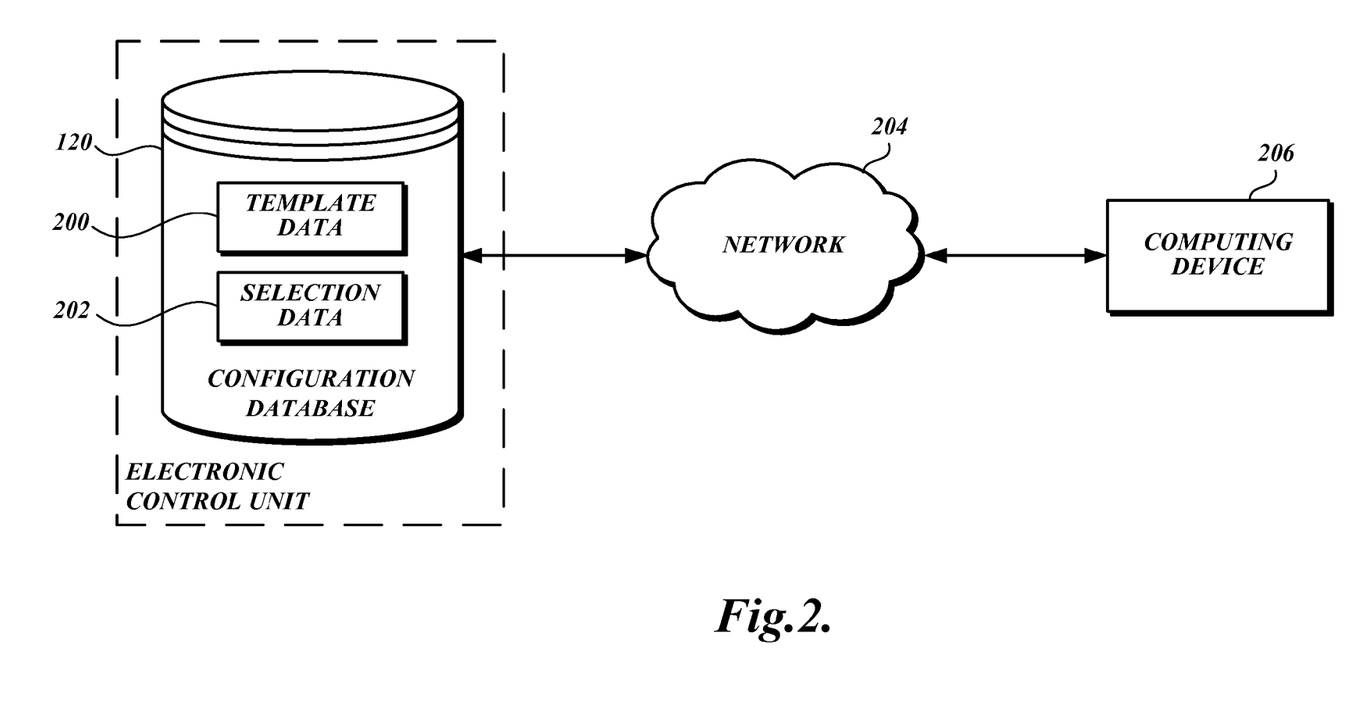
FIG. 2 is a block diagram depicting a configuration database that stores different types of data for customizing a graphical display in accordance with another embodiment of the disclosed subject matter.

As briefly mentioned above, the electronic control unit 106 may include a configuration database 120 that stores data relevant to rendering of instruments on the graphical display 108. Now, with reference to FIG. 2, additional aspects of the electronic control unit 106 and the configuration database 120 will be described. As illustrated in FIG. 2, the configuration database 120 stores different types of data that may be used to render one or more instruments on a graphical display, including the template data 200 and the selection data 202.

As mentioned previously, aspects of the present disclosure allow a common visual theme to be applied to an instrument cluster rendered on the graphical display 108. The template data 200 includes a plurality of templates that each have logic for implementing different visual themes. In this regard, each template provides semantic logic that describes a set of visual attributes that may include, but are not limited to, instrument and symbol graphics colors, locations, size, fonts, etc. Significantly, a template provided by the present disclosure describes these visual attributes in a way that does not depend on application logic used for calculating and/or processing vehicle readings. As a result, different templates may be selected and applied to modify the visual appearance of an instrument cluster without impacting other systems.

The selection data 202 maintained in the configuration database 120 may include data that describes selections made by a user in configuring the visual attributes of the graphical display 108. In one embodiment, the colors of symbol graphics and background of individual instruments can be configured by the user. As described above, a user may select a template or predefined theme in order to customize the visual attributes of an instrument cluster. In addition or alternatively, the user may assign colors to the symbol graphics and/or background of individual instruments. In instances when a template is applied, the color selections associated with an individual instrument may override the colors defined in the template. In any event, user selections that affect the visual attributes of an instrument cluster are represented in the selection data 202 that is maintained in the configuration database 120.

In one embodiment, a vehicle operator may customize the graphical display 108 and select instrument colors through direct interaction with control inputs of the vehicle. In addition, an application suitable for being executed on a general-purpose computing device 206 may be provided that models the graphical display 108. In this regard, the application allows a user to customize an instrument cluster by, for example, selecting a template and/or individual instrument colors. Based on the obtained input, the application may create a custom data file that describes customizations to an instrument cluster. In some embodiments, the electronic control unit 106 communicates and obtains the data file from the computing device 206 via the network 204. In this regard, the network 204 may utilize IP-based protocols and be implemented as a local area network ("LAN"), wireless network, wide area network ("WAN"), such as the Internet, and combinations thereof. However, since IP-based protocols for network communication are well known to those skilled in the art, those protocols will not be described here. In another embodiment, the data file that describes visual attributes of an instrument cluster may be saved to a portable memory device, such as a USB flash memory drive, and directly uploaded to the truck 100.

Now, with reference to FIGS. 3A-3C, a representative section of graphical display 108 (FIG. 2) that may be used to illustrate aspects of the present disclosure will be described. The graphical display 108 may present an instrument cluster in which each instrument is comprised of a plurality of symbol graphics. In the exemplary embodiment depicted in FIG. 3A, the instruments rendered on the graphical display 108 include the tachometer 300, speedometer 302, the trip description element 304, and the fluid level element 306. As known to those skilled in the art, the tachometer 300 and speedometer 302 may present information to convey the engine and vehicle speed, respectively. For example, engine and vehicle speed information may be collected by the electronic control unit 106 from an information generating component 110. The collected data is processed so that the appropriate readings may be presented on both the tachometer 300 and speedometer 302. In a similar way, data may be collected and processed in order to present readings for the other instruments rendered on the graphical display 108.

Figure 3A:
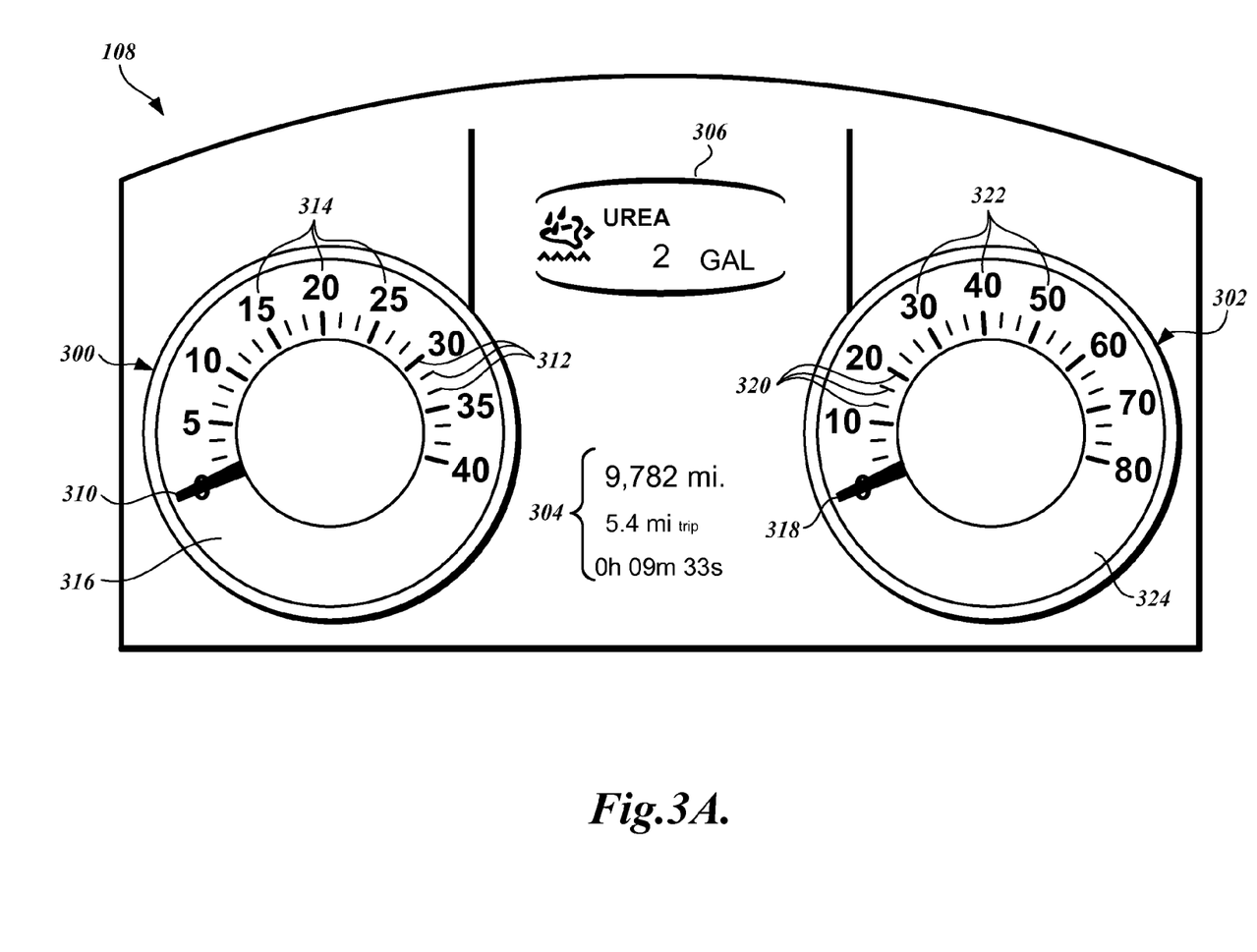
FIGS. 3A-3C are exemplary user interfaces depicting aspects of a graphical display in accordance with additional embodiments of the disclosed subject matter.

In the exemplary embodiment depicted in FIG. 3A, a template applies a common visual theme to instruments depicted on the graphical display 108. The color characteristics of the instruments 300-306 may vary depending on the logic defined in the template being applied. In the embodiment depicted in FIG. 3A, a "daytime" instrument template is applied that allows information presented on the graphical display 108 to be readily viewed (on a LCD or LPD screen) even if excessive lighting conditions exist. In this regard, the tachometer 300 is comprised of a plurality of symbol graphics that include the needle 310, the scale indicators 312, and the corresponding numeric indicators 314. Moreover, the tachometer 300 includes a faceplate 316 that serves as a background for the symbol graphics 310-314. The speedometer 302 is comprised of a similar set of symbol graphics that include the needle 318, the scale indicators 320, and the corresponding numeric indicators 322. Moreover, the speedometer 302 includes the faceplate 324 that serves as a background for the symbol graphics 318-322. In this instance, the "daytime" instrument template may assign the faceplates 316 and 324 a first color (i.e., white) that is in high contrast to a second color (i.e., black) that is assigned to the symbol graphics 310-314 and 318-322. The other instruments 304-306 rendered on the graphical display 108 may be assigned colors in a similar way so that readings may be viewed even in instances when excess lighting conditions exist.

Figure 3B:
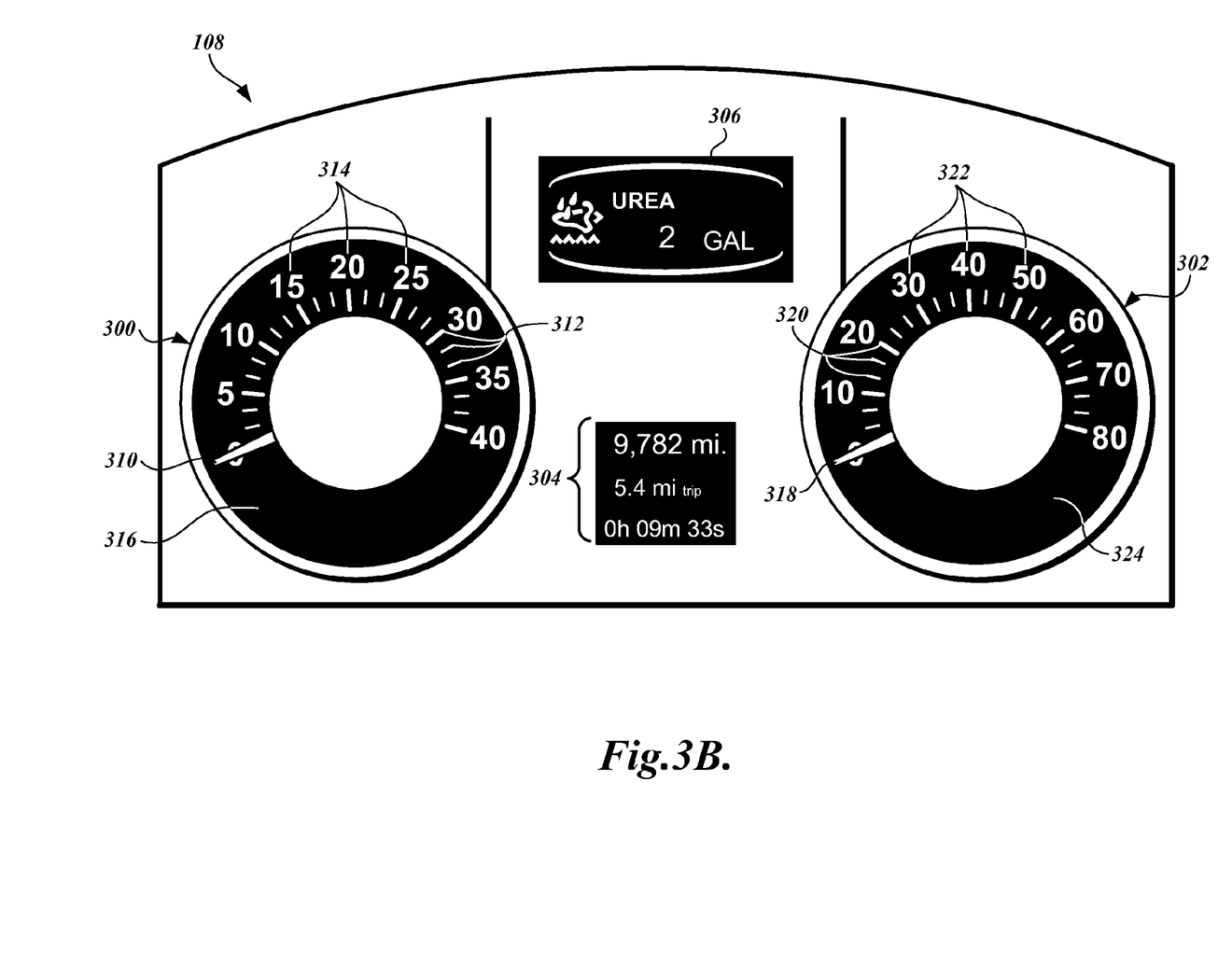

FIG. 3B includes the graphical display 108 that was described above with reference to FIG. 3A. Similar to the description provided above, the graphical display 108 depicted in FIG. 3B includes the tachometer 300, speedometer 302, the trip description element 304, and the fluid level element 306. However, in the embodiment depicted in FIG. 3B, a "nighttime" instrument template is applied that allows information presented on the graphical display 108 to be readily viewed (on a LCD or LPD screen) in low light conditions. In this instance, the "nighttime" instrument template may assign the faceplates 316 and 324 and the symbol graphics 310-314 and 318-322 colors that are converse of the "daytime" instrument template described above with reference to FIG. 3A. In particular, the faceplates 316 and 324 may be assigned the second color (i.e., black) with the symbol graphics 310-314 and 318-322 being assigned the first color (i.e., white). The other instruments 304-306 rendered on the graphical display 108 may be assigned colors in a similar way so that readings may be viewed in low light conditions.

While FIGS. 3A-3B provide examples of the types of templates and color changes that may be made, aspects of the present disclosure allow instruments to be customized in other ways. In this regard, aspects of the present disclosure allow the faceplates 316 and 324 and symbol graphics 310-314 and 318-322 to be assigned any color. Accordingly, other types of templates may be applied to customize the graphical display 108 and display instruments in a color configuration that, for example, corresponds to professional sports teams, universities, etc.

FIGS. 3A-3B provide examples in which a theme is applied to instruments rendered on the graphical display 108. In another embodiment, a user may assign colors to individual instruments without affecting the color configuration of other instruments. In the example depicted in FIG. 3C, the graphical display 108 includes the same instruments 300-306 described above with reference to FIGS. 3A-3B. However, in this instance, the color configuration of the speedometer 302 as previously represented in FIG. 3A was modified based on user input. In particular, the color of the faceplate 324, which serves as the background for the speedometer 302, was changed from white to a new color (i.e., blue). To implement the color change, a user may select a symbol graphic affected by the color change (i.e., the faceplate 324) and identify a new color from the color selection menu 350. In this regard, the color selection menu 350 includes a palette menu item 352 that identifies the current color of the selected symbol graphics (i.e., the faceplate 324). Using an input control, the user may identify a new color by selecting one of the other palette menu items 354-360. A user-defined color selection that affects one instrument (i.e., the speedometer 302) may be implemented even though a theme is applied to other instruments 300 and 304-306, rendered on the graphical display 108.

Figure 3C:
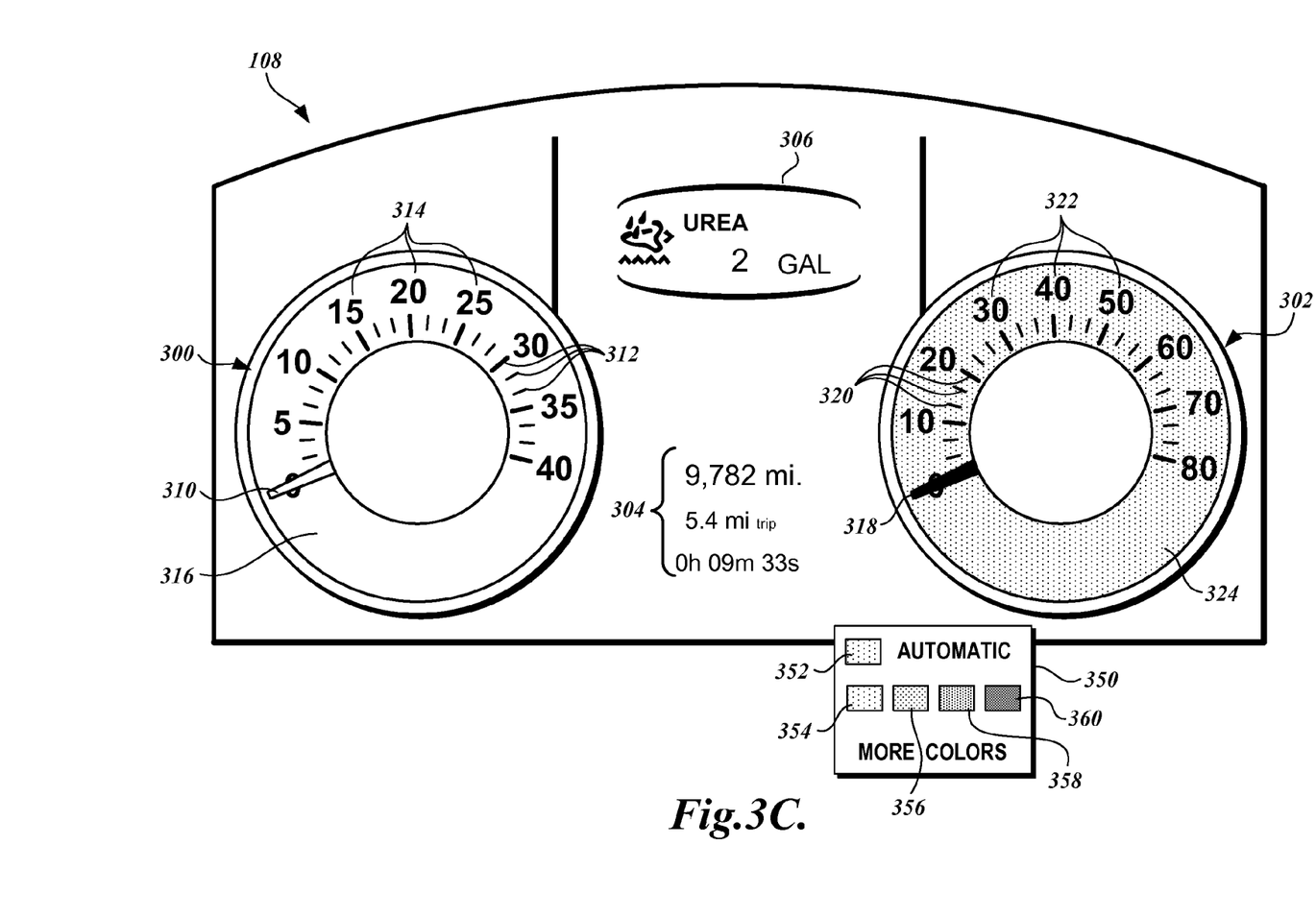

For the sake of convenience, much of the description provided above with reference to FIGS. 3A-C is made in the context of exemplary instruments and color choices. However, it should be well understood that the examples provided above are applicable in other contexts and should not be construed as limiting. For example, in the example described above with reference to FIG. 3C, a user implements a color change by interacting with input controls that are directly accessible from truck 100. However, as mentioned previously, template and/or color selections may be made using an application that executes on the general-purpose computing device 206. In this instance, the user interface of the application models the instrument cluster presented on the graphical display 108. Accordingly, the examples provided above with reference to FIGS. 3A-C should be construed as exemplary.

Now, with reference to FIG. 4, a flow diagram that depicts an exemplary embodiment of a display method 400 formed in accordance with the present disclosure will be described. In one embodiment, the display method 400 is responsible for implementing a color change to one or more instruments. In implementing the color change, logic is provided to ensure that the color change will result in sufficient contrast between the symbol graphics and background of an instrument. In instances when the color change would result in insufficient contrast, the display method 400 may increase the contrast between the symbol graphics and a background to ensure that the instruments' readings can be viewed.

Figure 4:
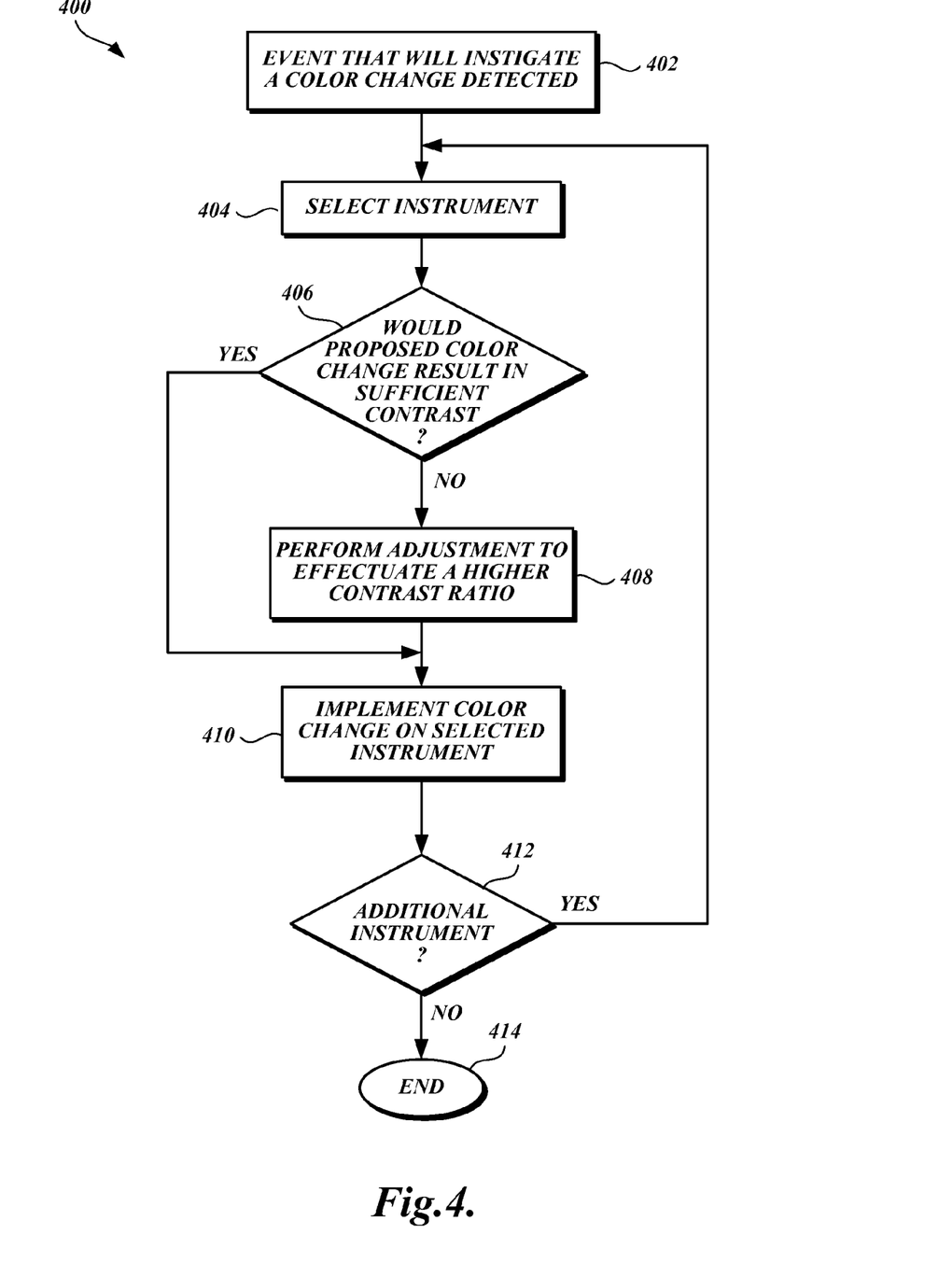
FIG. 4 is a flow diagram of a display method for rendering instruments in customizable colors in accordance with additional embodiments of the disclosed subject matter.

As illustrated in FIG. 4, the display method 400 begins at block 402 where an event that will instigate a color change is detected. As mentioned above, a color change to an instrument's symbol graphics and/or background may occur in a number of different instances. In one embodiment, a user may interact directly with control inputs in the truck 100 to effectuate a color change. In another embodiment, the user may make color selections and customize an instrument cluster using an application executed on a general-purpose computing device 206. In this instance, a data file generated by the application may be transmitted over the network 204 or uploaded to the truck using a portable memory device. Accordingly, the event detected at block 402 may be direct user input, the receipt of the data file, etc. However, those skilled in the art and others will recognize that a color change may be instigated in other instances without departing from the scope of the claimed subject matter.

At block 404, the display method 400 selects an instrument that will experience a color change as a result of the event detected at block 402. In some instances, multiple instruments are affected by a color change. For example, a user may select a template that applies a common visual theme to each of the instruments rendered on the graphical display 108. Accordingly, the display method 400 may iteratively select instruments and implement the color change on each instrument individually. In other instances, a color change may only affect one instrument, resulting in a single iteration of the display method 400.

At decision block 406, a test is performed to determine whether a proposed color change would result in sufficient contrast. As mentioned previously, the present disclosure provides an automated graphic contrast feature that ensures instruments are readable once a color change is implemented. Accordingly, a comparison is performed at block 406 to determine if the contrast between the selected instruments' symbol graphics and background colors is sufficient to allow readings to be viewed. For example, in the scenario described above with reference to FIG. 3C, user input was received to change the color of the faceplate 324, which serves as the background for the speedometer 302, to a new color (i.e., blue). In this instance, the test performed at block 406 determines if sufficient contrast exists between the new color of the faceplate 324 and the color assigned to the symbol graphics 318-322. If a sufficient amount of contrast will exist, the result of the test performed at block 406 will be "YES" and the display method 400 proceeds to block 410, as described in further detail below. If a sufficient amount of contrast would not exist, the result of the test performed at block 408 will be "NO" and the display method 400 proceeds to block 408.

At block 408 of the display method 400, the proposed colors for an instruments' symbol graphics and background are adjusted to effectuate a higher contrast ratio. If block 408 is reached, a proposed color change affecting the selected instrument would not result in sufficient contrast. In this instance, modifications to the visual attributes of the selected instruments' background and/or symbol graphics are implemented to effectuate a higher contrast ratio. In this regard, visual attributes of the background and/or symbol graphics that may be modified to effectuate a high contrast include luminance settings and RGB values, among others.

At block 410 of the display method 400, logic that implements a color change on the selected instrument is executed. In one embodiment, an animated transition occurs when a color change is performed. For example, in the scenario described above with reference to FIG. 3C, user input was received to change the color of the faceplate 324 from a first color (i.e., white) to a new color (i.e., blue). In this instance, the logic executed at block 410 causes the faceplate 324 to transition between the different colors over a predetermined period of time (i.e., one second). Accordingly, the color change results in a "fade effect" in which no sudden and potentially distracting changes are made to an instrument's appearance.

At decision block 412, a test is performed to determine if any additional instruments are affected by a color change. As mentioned previously, input may be received to perform a color change that affects multiple instruments. Accordingly, the display method 400 may iteratively select instruments on successive iterations of blocks 404-412. If a determination is made that at least one instrument affected by a color change has not been selected, the result of the test performed at block 412 is "YES." In this instance, the display method 400 returns back to block 404, and blocks 404-412 repeat, until the color change is fully implemented. Once all of the instruments affected by a color change have been selected and the result of the test performed at block 412 is "NO," the display method 400 proceeds to block 414, where it terminates.

While illustrative embodiments have been illustrated and described, it will be appreciated that various changes can be made therein without departing from the spirit and scope of the disclosed subject matter.

The embodiments of the disclosed subject matter in which an exclusive property or privilege is claimed are defined as follows:

1. A method for customizing a graphical display, the method comprising:
   by a processor, obtaining input configured to cause a color change to one or more instruments presented on the graphical display, wherein color assigned to the one or more instruments is independently customizable by a user;
   by the processor, for each instrument affected by the color change:
      determining whether a level of contrast between a symbol graphic of the instrument and one or more background colors of the instrument is below a threshold level of contrast; and
      if the level of contrast is below the threshold level of contrast, adjusting the contrast ratio between the symbol graphic and the one or more background colors to at least the threshold level; and
   by the processor, causing the graphical display to render the one or more instruments.

2. The method as recited in claim 1, wherein the input is obtained responsive to direct user interaction with controls in a vehicle to select a color for an instrument.

3. The method as recited in claim 1, wherein the input is obtained responsive to user interaction with an application executed on a computing device, and wherein the application is configured to generate data that describes a color configuration of the one or more instruments.

4. The method as recited in claim 1, wherein the input comprises a template that defines a common visual theme for the one or more instruments rendered on the graphical display.

5. The method as recited in claim 4, wherein the common visual theme defined in the template may be superseded by a user-defined color selection for an individual instrument.

6. The method as recited in claim 1, wherein adjusting the contrast ratio includes modifying luminance of the symbol graphic or one or more background colors.

7. A system for conveying information to a vehicle operator, comprising:
   a graphical display configured to display an instrument cluster comprising one or more instruments configured to convey vehicle readings;

a memory having stored therein program instructions of a display module configured to facilitate customization of the graphical display, wherein color assigned to the one or more instruments is independently customizable; and a processor configured to execute the program instructions of the display module to:

obtain input configured to cause a color change to the one or more instruments displayed on the graphical display;

for each instrument affected by the color change:

determine whether a level of contrast between a symbol graphic of the instrument and one or more background colors of the instrument is below a threshold level of contrast; and         if the level of contrast is below the threshold level of contrast, adjust the contrast ratio between the symbol graphic and one or more background colors to at least the threshold level; and     cause the graphical display to render the one or more instruments.

8. The system as recited in claim 7, wherein the input is obtained responsive to direct user interaction with controls in a vehicle to select a color for an instrument.

9. The system as recited in claim 7, wherein the input is obtained responsive to user interaction with an application executed on a computing device, and wherein the application is configured to generate data that describes a color configuration of the one or more instruments.

10. The system as recited in claim 7, wherein the input comprises a template that defines a common visual theme for the one or more instruments.

11. The system as recited in claim 10, wherein the common visual theme defined in the template may be superseded by a user-defined color selection for an individual instrument.

12. The system as recited in claim 7, wherein the processor is further configured to execute the program instructions of the display module to modify luminance of the symbol graphic or one or more background colors to adjust the contrast ratio.

13. A non-transitory computer readable storage medium having stored thereon modules comprising:

a user interface module comprising computer-executable instructions configured to cause a computer to obtain selections that describe a color configuration of one or more instruments configured to convey vehicle readings;

a database module comprising computer-executable instructions configured to cause the computer to store data that describes visual attributes of the one or more instruments including the selections obtained by the user interface module;

an adjustment module comprising computer-executable instructions configured to cause the computer to identify the amount of contrast between a symbol graphic and one or more background colors of the one or more instruments and to increase the amount of contrast if the amount of contrast is below a threshold level of contrast; and     a display module comprising computer-executable instructions configured to cause the computer to render the one or more instruments on a graphical display.

14. The computer-readable storage medium as recited in claim 13, further comprising a template module comprising computer-executable instructions configured to cause the computer to apply a common color theme to two or more of the instruments.

15. The computer-readable storage medium as recited in claim 14, wherein the common color theme may be superseded by a user-defined color selection.

16. The computer-readable storage medium as recited in claim 13, further comprising computer-executable instructions configured to generate data that describes the color configuration of the one or more instruments.

17. The computer-readable storage medium as recited in claim 13, wherein the selections are obtained via input controls of a vehicle.

18. The computer-readable storage medium as recited in claim 13, wherein the adjustment module further comprises computer-executable instructions configured to cause the computer to increase the amount of contrast by modifying luminance of the symbol graphic color or the one or more background colors.

19. The computer-readable storage medium as recited in claim 13, wherein the color configuration comprises different background colors for two or more of the instruments.

20. The computer-readable storage medium as recited in claim 13, wherein the color configuration comprises different colors for the symbol graphics of two or more of the instruments.

* * * * *